United States Patent [19]
Black et al.

[11] 3,891,764
[45] June 24, 1975

[54] METHOD OF INHIBITING HISTAMINE ACTIVITY WITH AMIDINE DERIVATIVES

[75] Inventors: James Whyte Black, Hemel Hempstead; Graham John Durant, Welwyn Garden City, both of England

[73] Assignee: SmithKline & French Laboratories Ltd., Welwyn Garden City, England

[22] Filed: May 28, 1974

[21] Appl. No.: 473,547

Related U.S. Application Data

[63] Continuation of Ser. No. 306,948, Nov. 15, 1972, abandoned, which is a continuation-in-part of Ser. No. 80,792, Oct. 14, 1970, abandoned.

[30] Foreign Application Priority Data
Oct. 29, 1969 United Kingdom............... 52892/69

[52] U.S. Cl. .............................................. 424/273
[51] Int. Cl. ........................................... A61k 27/00
[58] Field of Search ................................... 424/273

[56] References Cited
UNITED STATES PATENTS
3,354,174  11/1967  Bell................................. 260/309.2

OTHER PUBLICATIONS
Ash and Schild, Brit. J. Pharmac. Chemother., 27:427, 1966.
Black et al., Nature, 238, 385 (1972).
Kier, J. Med. Chem., 1968, p. 441–445.
Derwent Abstract 58609(s) abstracting Belgium Patent No. 763,744.

*Primary Examiner*—Albert T. Meyers
*Assistant Examiner*—Norman A. Drezin
*Attorney, Agent, or Firm*—Joan S. Keps; Richard D. Foggio; William H. Edgerton

[57] ABSTRACT

A method of inhibiting histamine activity by administering imidazolyl amidines.

5 Claims, No Drawings

METHOD OF INHIBITING HISTAMINE ACTIVITY WITH AMIDINE DERIVATIVES

This is a continuation of application Ser. No. 306,948 filed Nov. 15, 1972, now abandoned, which is a continuation-in-part of Ser. No. 80,792, filed Oct. 14, 1970, now abandoned.

This invention relates to a method of inhibiting histamine activity, and more particularly to inhibiting H-2 histamine receptors, with amidine derivatives. The compounds used in the methods of the invention normally exist as the addition salts, but for convenience, reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (*Brit. J. Pharmac. Chemother.* 27:427, 1966) as H-1. The substances and the pharmaceutical compositions of the present invention are distinguished by the fact that they act at histamine receptors other than the H-1 receptor, that is they act as H-2 histamine receptors which are described by Black, et al., Nature 236, 385 (1972). Black, et al., cited aove, page 390, column 2, state the following: "Mepyramine has been defined as an $H_1$-receptor antagonist[1] and burimamide has now been defined as an $H_2$-receptor antagonist. Used alone, burimamide can antagonize those responses to histamine, such as stimulation of acid gastric secretion, which cannot be blocked by mepyramine; histamine apparently activates $H_2$-receptors to produce these effects." Thus, from the Black, et al. paper, H-2 histamine receptors are those histamine receptors which are not inhibited by mepyramine but are inhibited by burimamide. Thus they are of utility in inhibiting certain actions of histamine which are not inhibited by the above-mentioned "antihistamines." Inhibitors of H-2 histamine receptors are useful, for example, as inhibitors of gastric acid secretion and as anti-inflammatory agents particularly where the inflammation is kinin-mediated.

In so far as tautomerism affects the compounds mentioned in this specification, the ring numbering of the imidazole nucleus has been modified accordingly.

The method of inhibiting H-2 histamine receptors according to this invention comprises administering internally to animals in an amount sufficient to produce such activity a compound of Formula I:

FORMULA I

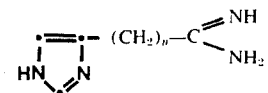

wherein $n$ is 3 or 4.

Another object of this invention is a method of inhibiting gastric acid which comprises administering internally to an animal in an amount sufficient to inhibit gastric acid secretion a compound of Formula I.

The amidines of Formula I may be prepared from a nitrile of Formula II:

FORMULA II

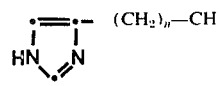

wherein $n$ is 3 or 4. The nitrile wherein $n$ is 4 may be synthesised from 4-[4(5)-imidazolyl]butyric acid by way of the ethyl ester which can then be reduced to 4(5)-(4-hydroxybutyl) imidazole which is converted to the chloride and then to the required nitrile. This method is described in detail in Example I hereinafter.

Treatment of the nitrile of Formula II under anhydrous conditions in the presence of a strong acid (which may be introduced in gaseous form into the reaction mixture) with an alcohol ROH, e.g., methanol or ethanol, gives an imino-ether of Formula III:

FORMULA III

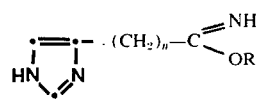

wherein $n$ is 3 or 4 and R is, for example, methyl or ethyl, which may then be treated with ammonia to yield the required amidine of Formula I.

Alternatively, treatment of the nitrile of Formula II at elevated temperature with an ammonium salt gives the required amidine compound directly.

A third method which may be used for the production of the amidines from nitriles of Formula II involves treatment with hydroxylamine in alcoholic solution and in the presence of an alkoxide to yield an amidoxime of the Formula IV:

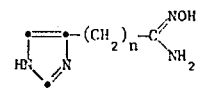

wherein $n$ is 3 or 4, which may be the catalytically hydrogenated to yield the corresponding amidine of Formula I.

The compounds of Formula I may be combined with a pharmaceutically acceptable carrier to form pharmaceutical compositions. Advantageously the compositions will be made up in a dosage unit form appropriate to the desired mode of administration. The pharmaceutical carrier employed may be, for example, either a solid or liquid. Exemplary of solid carriers are lactose, terra alba, sucrose, talc, gelatin, agar pectin, acacia, magnesium stearate, stearic acid and the like. Exemplary of liquid carriers are syrup, peanut oil, olive oil, water and the like. Other pharmacologically active compounds may in certain cases be included in the pharmaceutical compositions.

As stated above, the amidine compounds of Formula I have been found to have pharmacological activity in the animal body as antagonists to certain actions of histamine which are not blocked by "antihistamines" such as mepyramine. For example, they have been found to inhibit selectively the histamine-stimulated secretion of gastric acid from the lumen-perfused stomachs of rats anaesthetised with urethane, at doses from 8 to 256 micromoles per kilogram intravenously. This procedure is described in the above-mentioned paper of Ash and Schild. Similarly, the action of these compounds and compositions may, in many cases, be demonstrated by their antagonism to the effects of histamine on other tissues which, according to the above-mentioned paper of Ash and Schild, are not H-1 receptors. Examples of such tissues are perfused isolated guinea-pig heart, isolated guinea-pig right atrium and isolated rat uterus.

The compounds of the method of this invention inhibit the secretion of gastric acid stimulated by pentagastrin or by food. In addition, these compounds also show anti-inflammatory activity in conventional tests such as the rat paw oedema test and u.v. erythema test. In the rat paw oedema test where the oedema is induced by bradykinin the paw volume is reduced by 48% by subcutaneous injection of doses of about 500 micromoles/kg i.e., a dose per single rat of about 15 mg. The level of activity found for the compounds used in the method of the present invention is illustrated by the effective dose range in the anaesthetized rat, that is from 8 to 256 micromoles per kilogram, given intravenously, and also by the dose effective in the rat paw oedema test.

A wide variety of pharmaceutical forms can be employed. Thus, if a solid carrier is used, the preparation can be tableted, placed in a hard gelatin capsule in powder or pellet form, or in the form of a troche or lozenge. The amount of solid carrier will vary widely but preferably will be from about 25 mg to about 1 gm. If a liquid carrier is used, the preparation may be in the form of a syrup, emulsion, soft gelatin capsule, sterile injectable liquid such as an ampoule, or an aqueous or nonaqueous liquid suspension.

The pharmaceutical compositions are prepared by conventional techniques involving procedures such as mixing, granulating and compressing or dissolving the ingredients as appropriate to the desired preparation.

The active ingredient will be present in the composition in an effective amount to inhibit histamine activity. The route of administering may be orally or parenterally.

Preferably, each dosage unit will contain the active ingredient in an amount of from about 100 mg to about 250 mg.

The active ingredient will preferably be administered in equal doses three to six times per day. The daily dosage regimen will preferably be from about 750 mg to about 1000 mg.

For therapeutic use, the pharmacologically active compounds of the present invention will normally be administered as a pharmaceutical composition comprising as the or an essential active ingredient at least one such compound in the basic form or in the form of an addition salt with a pharmaceutically acceptable acid and in association with a pharmaceutical carrier therefor. Such addition sales include those with hydrochloric, hydrobromic, hydriodic, sulphuric, picric and maleic acids.

Advantageously the composition will be made up in a dosage form appropriate to the desired mode of administration, for example as a tablet, capsule, injectable solution or, when used as an anti-inflammatory agent, as a cream for topical administration.

The invention is illustrated but in no way limited by the following examples.

EXAMPLE 1

Preparation of 5-(4(5)-imidazolyl)valeramidine dihydrochloride

4-[4(5)-imidazolyl]butyric acid hydrochloride (72.0 g) is esterified using a solution of gaseous hydrogen chloride in ethanol (14.5%). The solution is heated under reflux for 18 hours in the presence of a molecular sieve contained in a Soxhlet apparatus. Concentration affords the ethyl ester hydrochloride (78.2 g) which is converted into the base by dissolving in absolute alcohol (200 ml) and neutralizing with a solution prepared from sodium (7.93 g) in alcohol (250 ml). Following removal of inorganic material the crude ester base (54.7 g) is isolated and used without further purification.

This ester is dissolved in anhydrous tetrahydrofuran (700 ml) and added slowly to a stirred suspension of lithium aluminium hydride (46.6 g) in anhydrous tetrahydrofuran (220 ml). Stirring is continued at room temperature for 17 hours whereupon water (84 ml) is slowly added, followed by the application of moderate heat for 15 minutes. The solid present is removed by filtration and extracted three times with hot tetrahydrofuran. The combined extracts are evaporated to an oil (23 g) a sample of which is converted into an oxalate salt, m.p. 104°–106°C. for characterisation.

The foregoing 4(5)-(4-hydroxybutyl)imidazole (10 g) is added slowly to thionyl chloride (20 ml) with stirring. The resultant solution is heated on the steam bath for ten minutes and evaporated to an oil which is reevaporated with benzene to remove last traces of thionyl chloride. The residual oil is dissolved in alcohol, treated with charcoal, concentrated and diluted with ether. Cooling affords 4(5)-(4-chlorobutyl)imidazole hydrochloride as a sticky solid (12 g). Without further purification, the chloro compound (10.0 g) is dissolved in anhydrous dimethylformamide (43 ml) and slowly added to a dispersion of sodium cyanide (8.3 g) in in anhydrous dimethylformamide (330 ml) at 110°C., with stirring. After addition, the mixture is maintained at 110°C. for 15 minutes and then concentrated under reduced pressure. The residue is extracted with ethyl acetate and the extracts are treated with charcoal and evaporated to an oil. Cooling and agitation of the oil with dry ether affords a crystalline solid (2.8 g) which is collected. Recrystallization from ethyl acetate yields 4(5)-(4-cyanobutyl)imidazole, m.p. 97°–99°C. The nitrile is obtained analytically pure by chromatographing on a column of silica gel and eluting with ethanol-ethylacetate.

The nitrile is converted into its hydrochloride salt (2.22 g) and dissolved in anhydrous methanol (5 ml). The solution is cooled and stirred during the slow addition of a saturated methanolic solution of hydrogen chloride.

After addition the solution is stirred at 0°C. for three hours and diluted with ether. The imino-ether hydrochloride separates as an oil which is washed twice with cold ether and dissolved in absolute alcohol (5 ml). An ice cold solution prepared from anhydrous ammonia (2.1 g) and ethanol (15 ml) is added rapidly with external cooling. After one hour at 0°C. the mixture is allowed to attain room temperature. Ammonium chloride is filtered off and the filtrate is evaporated to an oil. A slight excess of ethanolic hydrogen chloride is added and the solution is again evaporated. Trituration of the residue with a little absolute alcohol followed by recrystallization from ethanol-ether affords pure 5-(4(5)-imidazolyl)valeramidine dihydrochloride, m.p. 221°–222°C.

EXAMPLE 2

Preparation of 4-(4(5)-imidazolyl)butyramidine dihydrochloride 4-(4(5)-imidazolyl)butyronitrile (2.0 g) is converted into its hydrochloride salt (m.p. 134°–136°C.) and then caused to react with methanolic hydrogen chloride, in a manner similar to that described in Example 1, affording the imino-ether dihydrochloride as an oil. Further reaction with ethanolic ammonia, as previously described, followed by recrystallization of the product from ethanol yields 4-(4(5)-imidazolyl)butyramidine dihydrochloride, m.p. 192°–195°C.

EXAMPLE 3

5-(4(5)-imidazolyl)valeramidine dihydrochloride is converted into the free base using ion-exchange resin (OH⁻ form). The addition of ethanolic hydrogen bromide affords 5-(4(5)-imidazolyl)valeramidine dihydrobromide.

EXAMPLE 4

A solution of 5-(4(5)-imidazolyl)valeramidine dihydrochloride in water is passed down on ion-excahnge column (SO$_4^{--}$). Elution with water and concentration affords 5(4(5)-imidazolyl)valeramidine sulphate.

EXAMPLE 5

| Ingredients | Amounts |
|---|---|
| 5-(4(5)-imidazolyl)valeramidine dihydrochloride | 150 mg |
| Sucrose | 75 mg |
| Starch | 25 mg |
| Talc | 5 mg |
| Stearic acid | 2 mg |

The ingredients are screened, mixed and filled into a hard gelatin capsule.

EXAMPLE 6

| Ingredients | Amounts |
|---|---|
| 4-(4(5)-imidazolyl)butyramidine dihydrochloride | 200 mg |
| Lactose | 100 mg |

The ingredients are screened, mixed and filled into a hard gelatin capsule.

The capsules prepared as in Examples 5 and 6 are administered orally to a subject having excessive gastric acid secretion within the dose ranges given hereabove.

What is claimed is:

1. A method of inhibiting H-2 histamine receptors, said H-2 histamine receptors being those histamine receptors which are not inhibited by mepyramine but are inhibited by burimamide, which comprises administering internally to an animal requiring inhibition of said H-2 histamine receptors in an amount sufficient to inhibit said H-2 histamine receptors a compound of the formula:

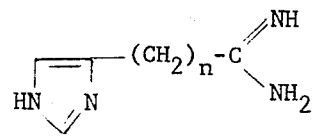

where $n$ is 3 or 4 or a pharmaceutically acceptable acid addition salt thereof.

2. A method according to claim 1 in which $n$ is 4.
3. A method according to claim 1 in which $n$ is 3.
4. A method of inhibiting gastric acid secretion which comprises administering internally to an animal requiring inhibition of gastric acid secretion in an amount sufficient to inhibit gastric acid secretion a compound of the formula:

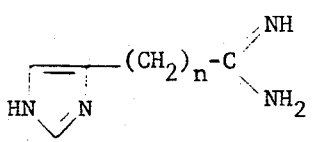

wherein $n$ is 3 or 4 or a pharmaceutically acceptable acid addition salt thereof.

5. A method of producing anti-inflammatory activity which comprises administering to an animal requiring said activity in an amount sufficient to produce said activity a compound of the formula:

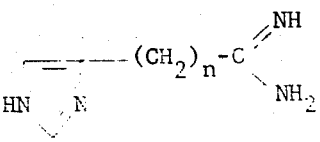

wherein $n$ is 3 or 4 or a pharmaceutically acceptable acid addition salt thereof.

* * * * *